United States Patent
Asai

(10) Patent No.: US 10,798,257 B2
(45) Date of Patent: Oct. 6, 2020

(54) COMPUTER-READABLE MEDIUM, INFORMATION PROCESSING DEVICE, AND METHOD FOR SELECTING IMAGE PROCESSING APPARATUS

(71) Applicant: BROTHER KOGYO KABUSHIKI KAISHA, Nagoya, Aichi (JP)

(72) Inventor: Norihiko Asai, Tajimi (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 16/143,565

(22) Filed: Sep. 27, 2018

(65) Prior Publication Data

US 2019/0104224 A1    Apr. 4, 2019

(30) Foreign Application Priority Data

Sep. 29, 2017 (JP) .................. 2017-189652

(51) Int. Cl.
*G06F 3/12* (2006.01)
*H04N 1/00* (2006.01)

(52) U.S. Cl.
CPC ..... *H04N 1/00233* (2013.01); *H04N 1/00225* (2013.01); *H04N 1/00458* (2013.01)

(58) Field of Classification Search
CPC .......... H04N 1/00233; H04N 1/00225; H04N 1/00458
USPC ................ 358/1.1–1.18, 402, 474
See application file for complete search history.

(56) References Cited

U.S. PATENT DOCUMENTS

| 2008/0297833 | A1* | 12/2008 | Hatakeyama | G06F 3/1204 358/1.15 |
| 2011/0261396 | A1* | 10/2011 | Takahashi | G06F 3/1204 358/1.15 |
| 2012/0243043 | A1 | 9/2012 | Asai | |
| 2013/0208131 | A1* | 8/2013 | Grewal | H04N 1/00278 348/207.2 |
| 2015/0378659 | A1* | 12/2015 | Asai | G06F 3/1292 358/1.15 |
| 2018/0210684 | A1* | 7/2018 | Kato | G06F 3/1204 |

FOREIGN PATENT DOCUMENTS

| JP | 2012-203742 A | 10/2012 |
| JP | 2015-203956 A | 11/2015 |
| JP | 2017-117293 A | 6/2017 |

* cited by examiner

*Primary Examiner* — Gabriel I Garcia
(74) *Attorney, Agent, or Firm* — Scully Scott Murphy and Presser

(57) ABSTRACT

A non-transitory computer-readable medium stores computer-readable instructions that are executable by a processor coupled with an information processing device, the information processing device including a communication interface, the instructions being configured to, when executed by the processor, cause the processor to determine whether a selected image processing apparatus is set, in a case where it is determined that the selected image processing apparatus is not set, search for and find one or more image processing apparatuses communicable with the information processing device via the communication interface, set a specified one of the found one or more image processing apparatuses as the selected image processing apparatus, and cause the selected image processing apparatus to perform a particular kind of image processing.

20 Claims, 11 Drawing Sheets

Figure 1:
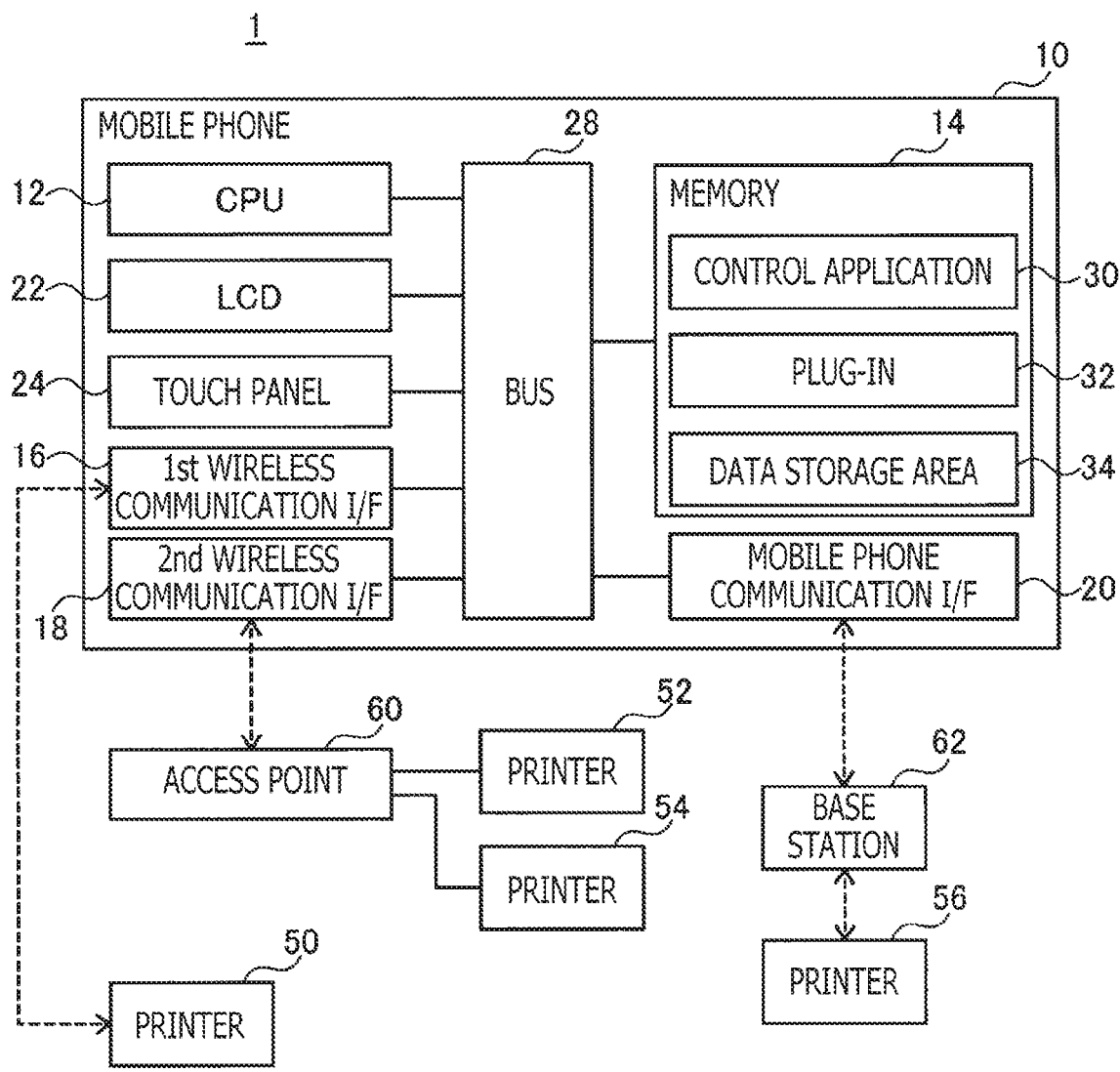

COMPUTER-READABLE MEDIUM, INFORMATION PROCESSING DEVICE, AND METHOD FOR SELECTING IMAGE PROCESSING APPARATUS

CROSS-REFERENCE TO RELATED APPLICATION

This application claims priority under 35 U.S.C. § 119 from Japanese Patent Application No. 2017-189652 filed on Sep. 29, 2017. The entire subject matter of the application is incorporated herein by reference.

BACKGROUND

Technical Field

Aspects of the present disclosure are related to a computer-readable medium storing computer-readable instructions that are executable by a processor coupled with an information processing device communicable with an image processing apparatus.

Related Art

An information processing device has been known that is communicable with a plurality of image processing apparatuses and configured to select one of the communicable image processing apparatuses and cause the selected apparatus to perform image processing.

SUMMARY

The known information processing device may not be user-friendly as a user needs to perform a lot of operations to select one of the image processing apparatuses and cause the selected apparatus to perform image processing.

Aspects of the present disclosure are advantageous to provide one or more improved techniques that make it possible to select one of image processing apparatuses and cause the selected apparatus to perform image processing via a smaller number of user operations than the known technique.

According to aspects of the present disclosure, a non-transitory computer-readable medium is provided, which stores computer-readable instructions that are executable by a processor coupled with an information processing device. The information processing device includes a communication interface configured to communicate with one or more external apparatuses. The instructions are configured to, when executed by the processor, cause the processor to determine whether a selected image processing apparatus is set, in a case where it is determined that the selected image processing apparatus is not set, search for and find one or more image processing apparatuses communicable with the information processing device via the communication interface, set a specified one of the found one or more image processing apparatuses as the selected image processing apparatus, and cause the selected image processing apparatus to perform a particular kind of image processing.

According to aspects of the present disclosure, further provided is an information processing device that includes a communication interface configured to communicate with one or more external apparatuses, and a controller configured to determine whether a selected image processing apparatus is set, in a case where it is determined that the selected image processing apparatus is not set, search for and find one or more image processing apparatuses communicable with the information processing device via the communication interface, set a specified one of the found one or more image processing apparatuses as the selected image processing apparatus, and cause the selected image processing apparatus to perform a particular kind of image processing.

According to aspects of the present disclosure, further provided is a method implementable by a processor coupled with an information processing device. The information processing device includes a communication interface configured to communicate with one or more external apparatuses. The method includes determining whether a selected image processing apparatus is set, in a case where it is determined that the selected image processing apparatus is not set, searching for and finding one or more image processing apparatuses communicable with the information processing device via the communication interface, setting a specified one of the found one or more image processing apparatuses as the selected image processing apparatus, and causing the selected image processing apparatus to perform a particular kind of image processing.

BRIEF DESCRIPTION OF THE ACCOMPANYING DRAWINGS

FIG. 1 is a block diagram schematically showing a configuration of a communication system in a first illustrative embodiment according to one or more aspects of the present disclosure.

Figure 2:
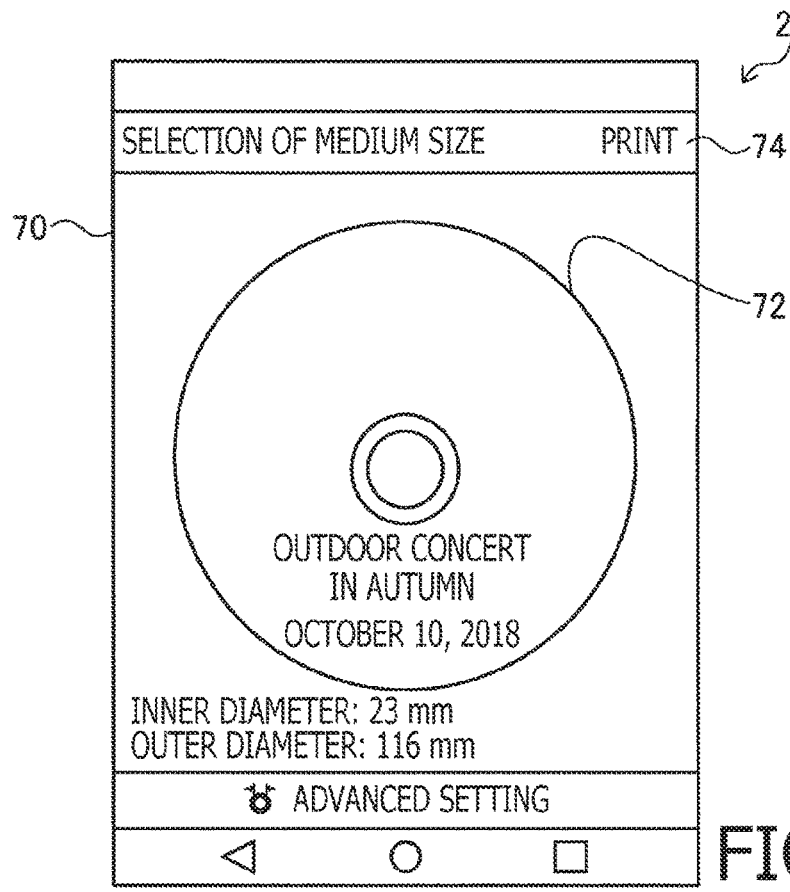

FIG. 2 exemplifies a generated-image display screen displayed on an LCD of a mobile phone included in the communication system, in the first illustrative embodiment according to one or more aspects of the present disclosure.

Figure 3:
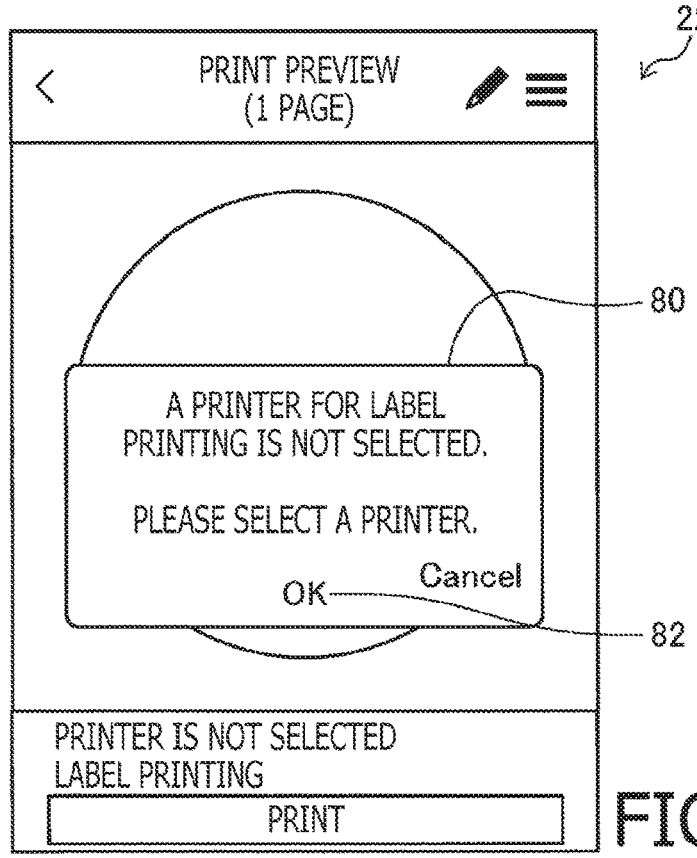

FIG. 3 exemplifies a first error screen displayed on the LCD of the mobile phone, in the first illustrative embodiment according to one or more aspects of the present disclosure.

Figure 4:
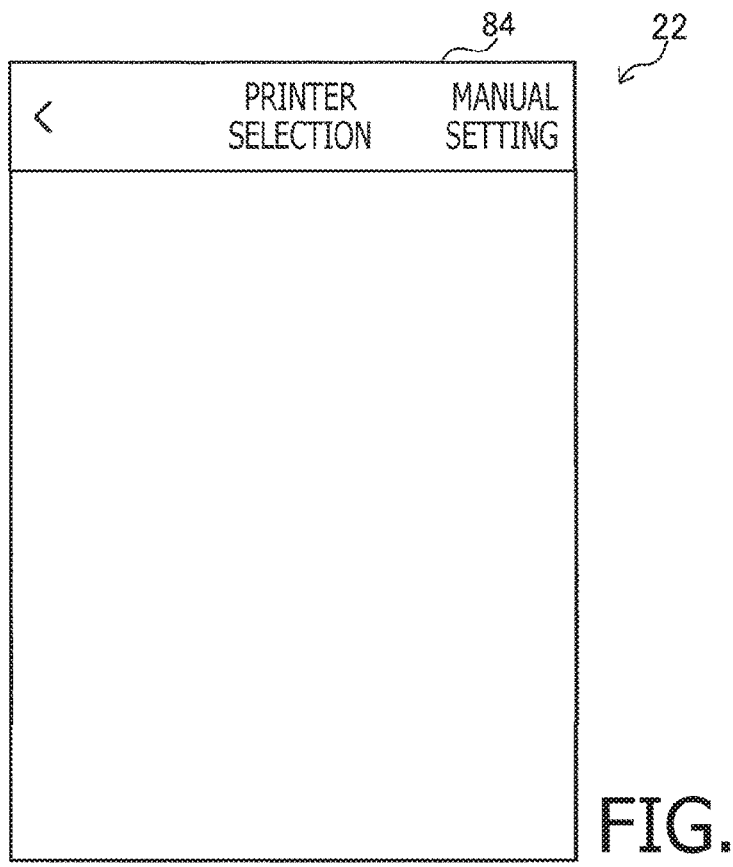

FIG. 4 exemplifies a search screen displayed on the LCD of the mobile phone, in the first illustrative embodiment according to one or more aspects of the present disclosure.

Figure 5:
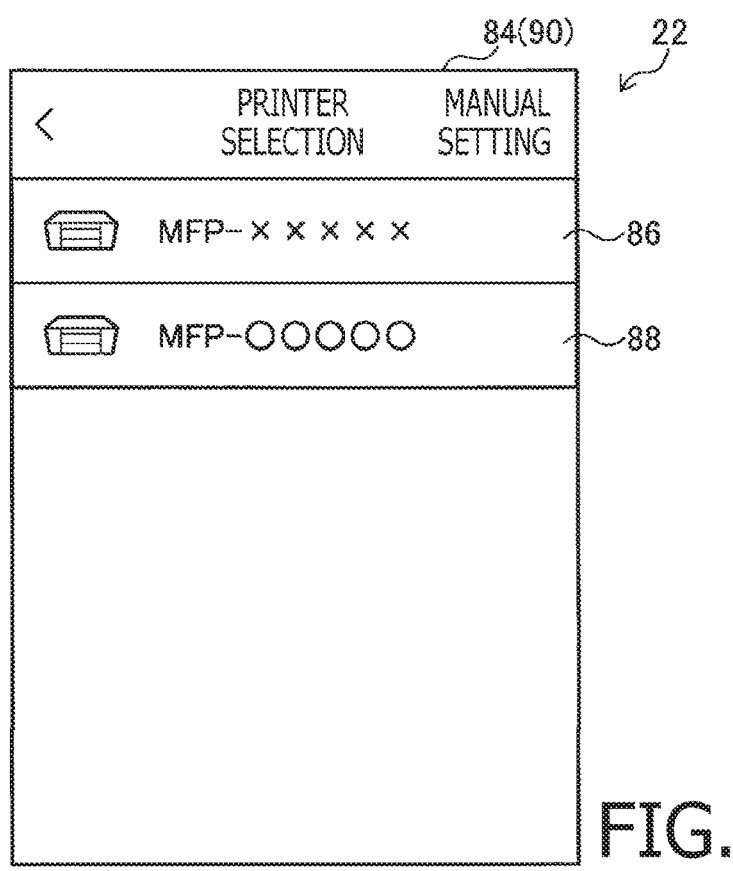

FIG. 5 exemplifies a selection screen displayed on the LCD of the mobile phone, in the first illustrative embodiment according to one or more aspects of the present disclosure.

Figure 6:
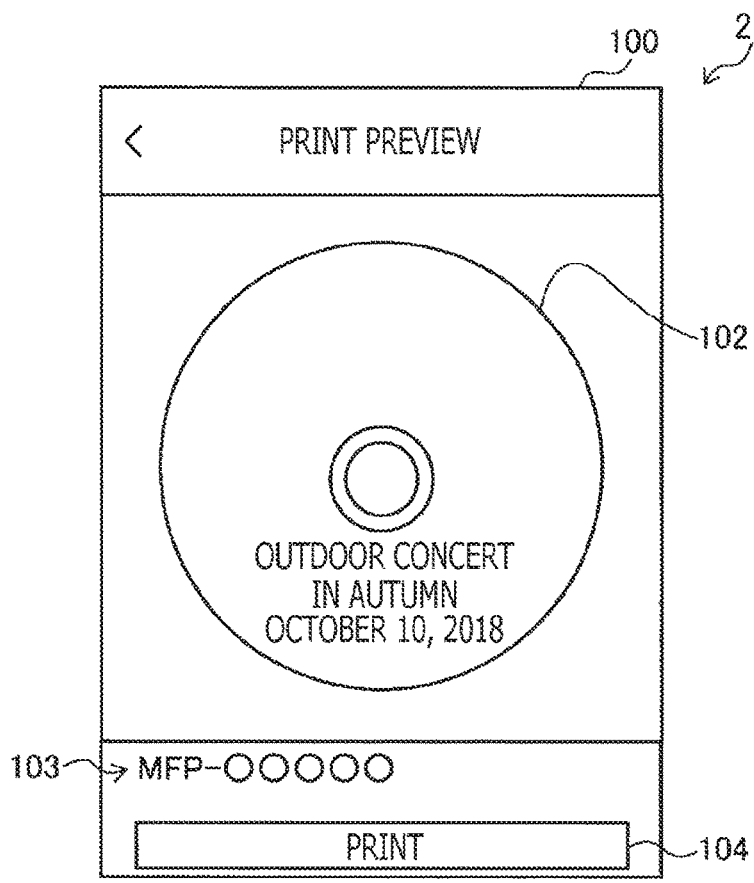

FIG. 6 exemplifies a first preview screen displayed on the LCD of the mobile phone, in the first illustrative embodiment according to one or more aspects of the present disclosure.

Figure 7:
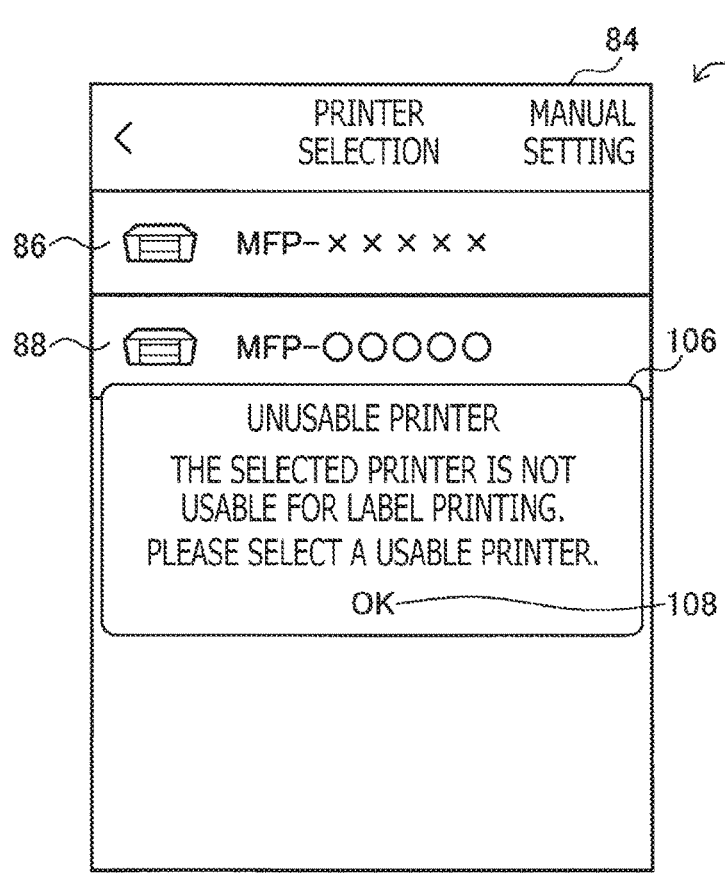

FIG. 7 exemplifies a second error screen displayed on the LCD of the mobile phone, in the first illustrative embodiment according to one or more aspects of the present disclosure.

Figure 8:
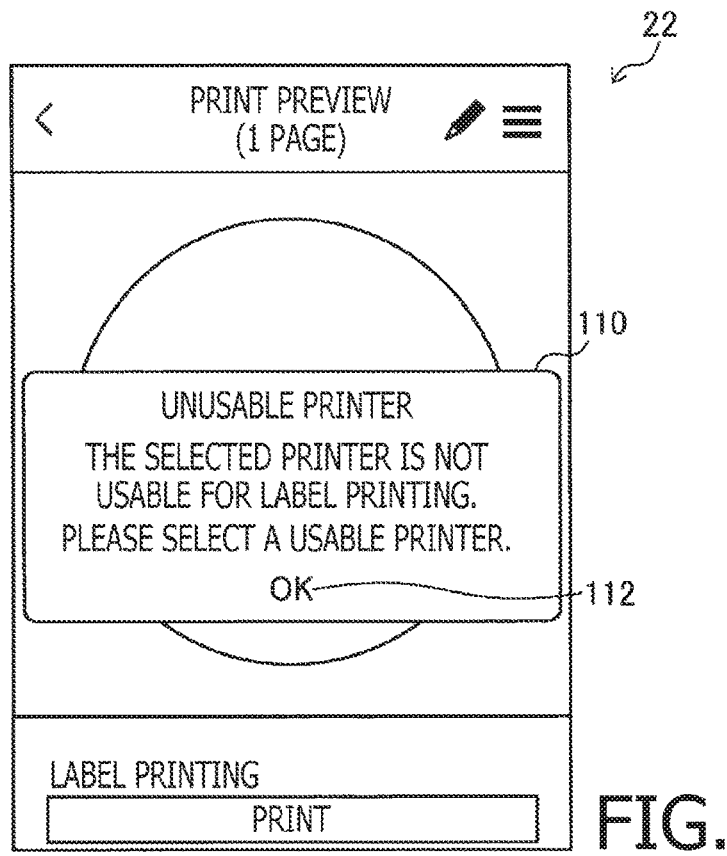

FIG. 8 exemplifies a third error screen displayed on the LCD of the mobile phone, in the first illustrative embodiment according to one or more aspects of the present disclosure.

Figure 9:
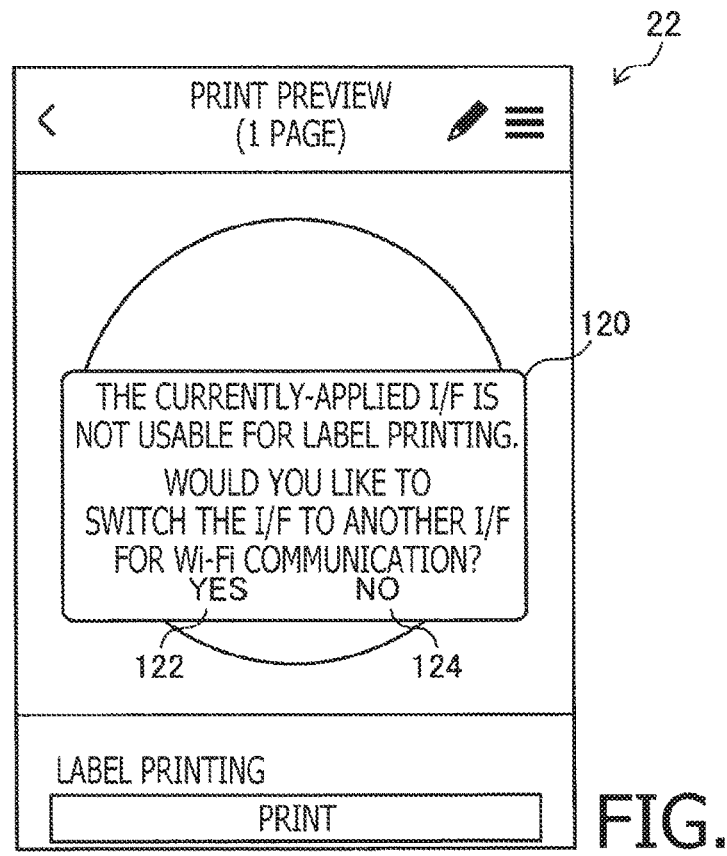

FIG. 9 exemplifies an I/F switching screen displayed on the LCD of the mobile phone, in the first illustrative embodiment according to one or more aspects of the present disclosure.

Figure 10:
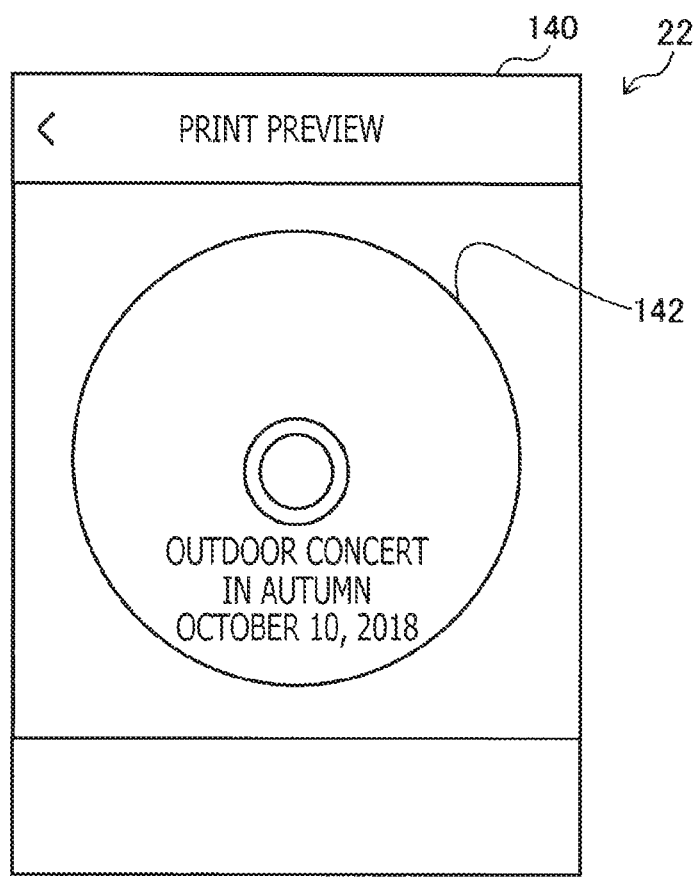

FIG. 10 exemplifies a second preview screen displayed on the LCD of the mobile phone, in the first illustrative embodiment according to one or more aspects of the present disclosure.

Figure 11:
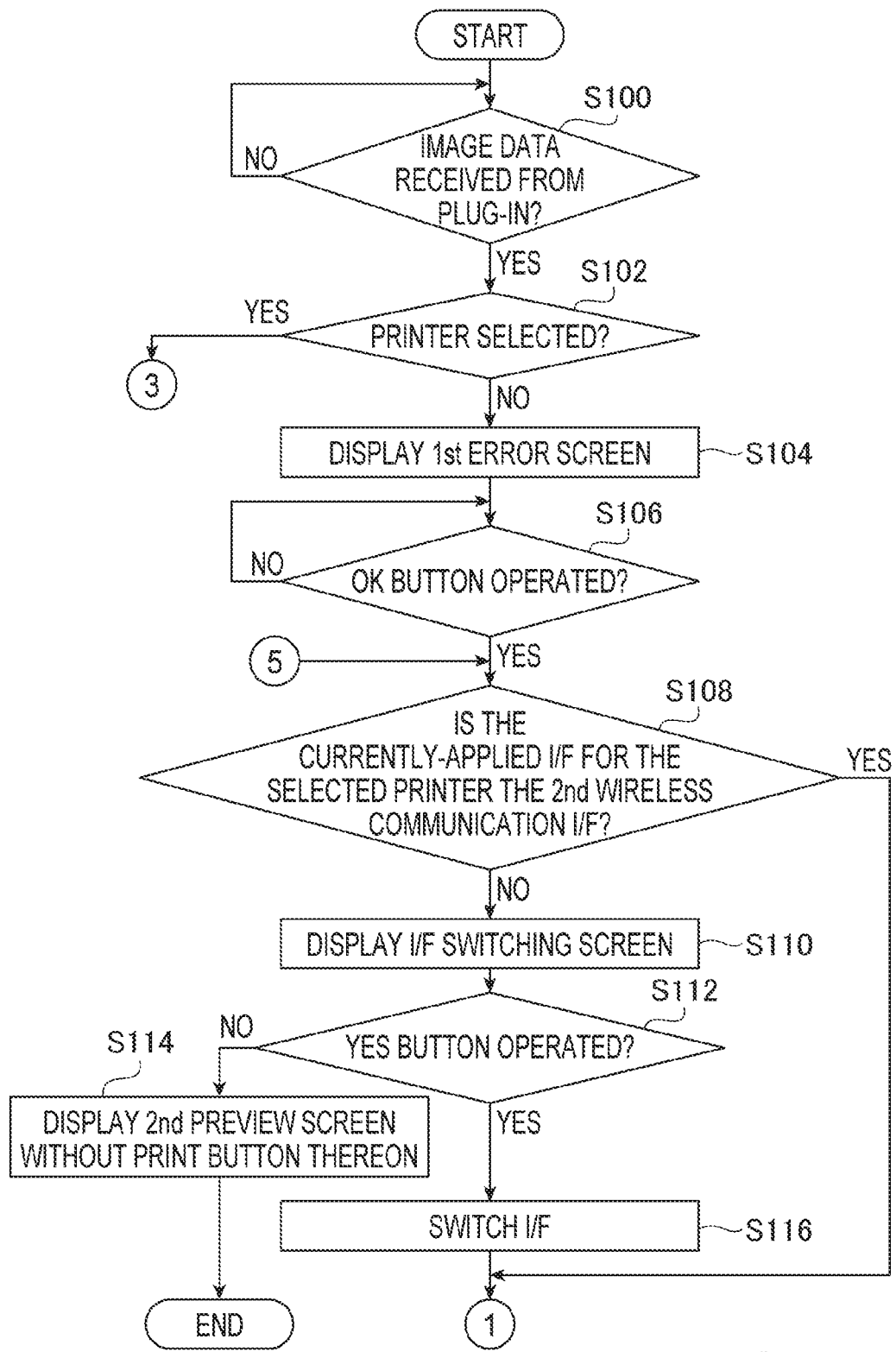
Figure 12:
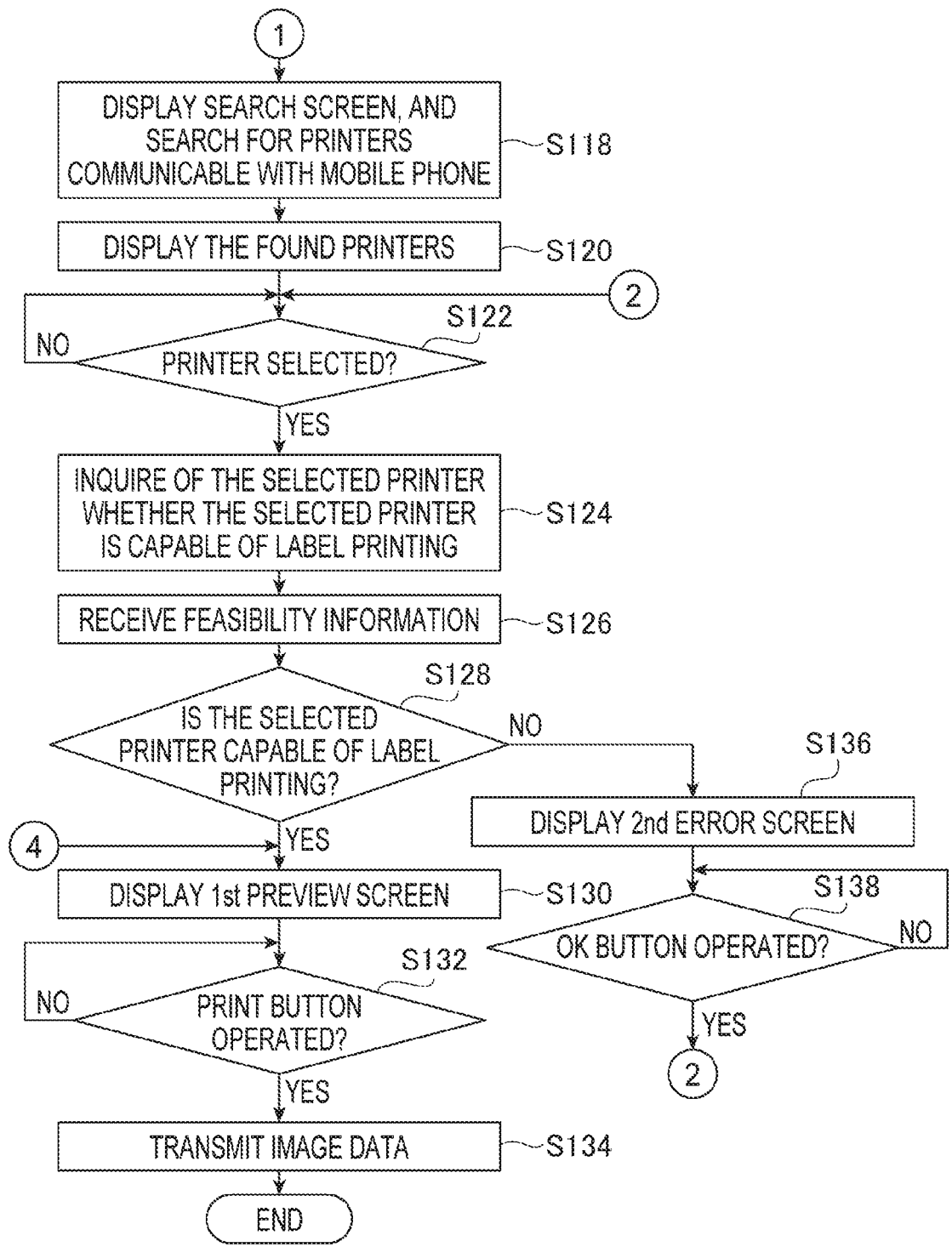
Figure 13:
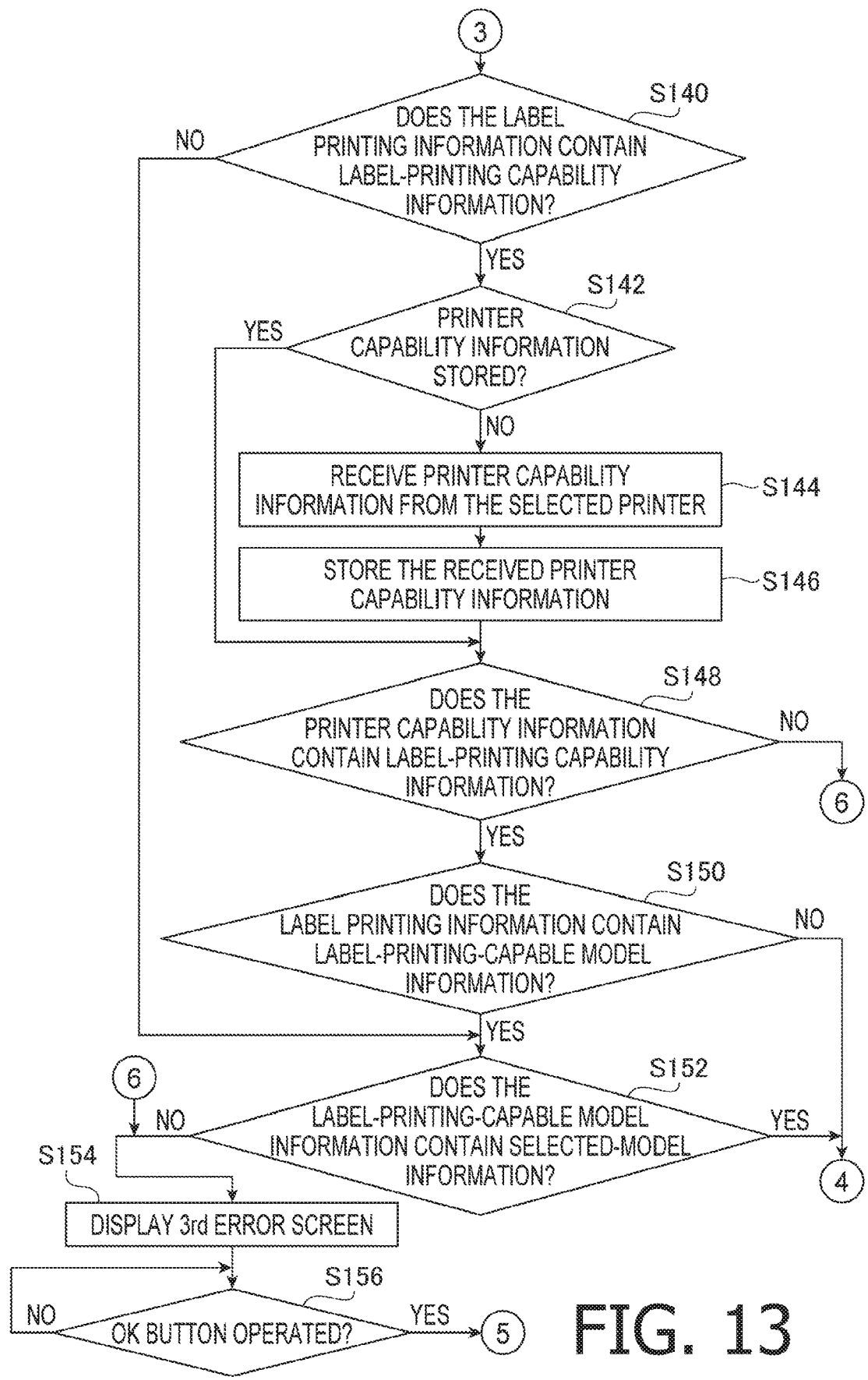

FIGS. 11, 12, and 13 are flowcharts showing a sequence of processes to be performed by execution of a control application stored in the mobile phone, in the first illustrative embodiment according to one or more aspects of the present disclosure.

Figure 14:
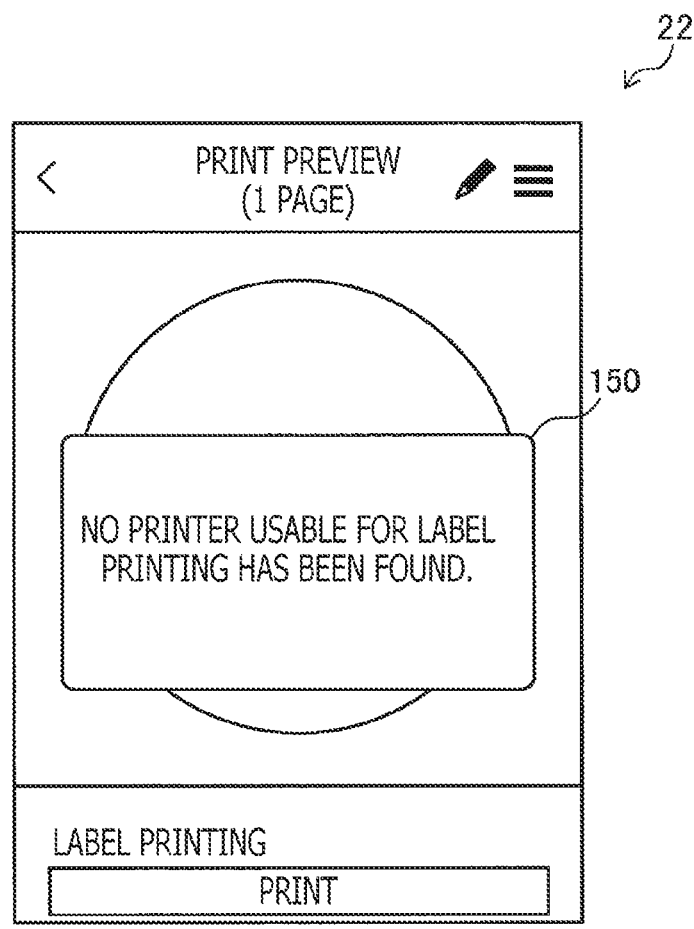

FIG. 14 exemplifies a fourth error screen displayed on the LCD of the mobile phone, in a second illustrative embodiment according to one or more aspects of the present disclosure.

Figure 15:
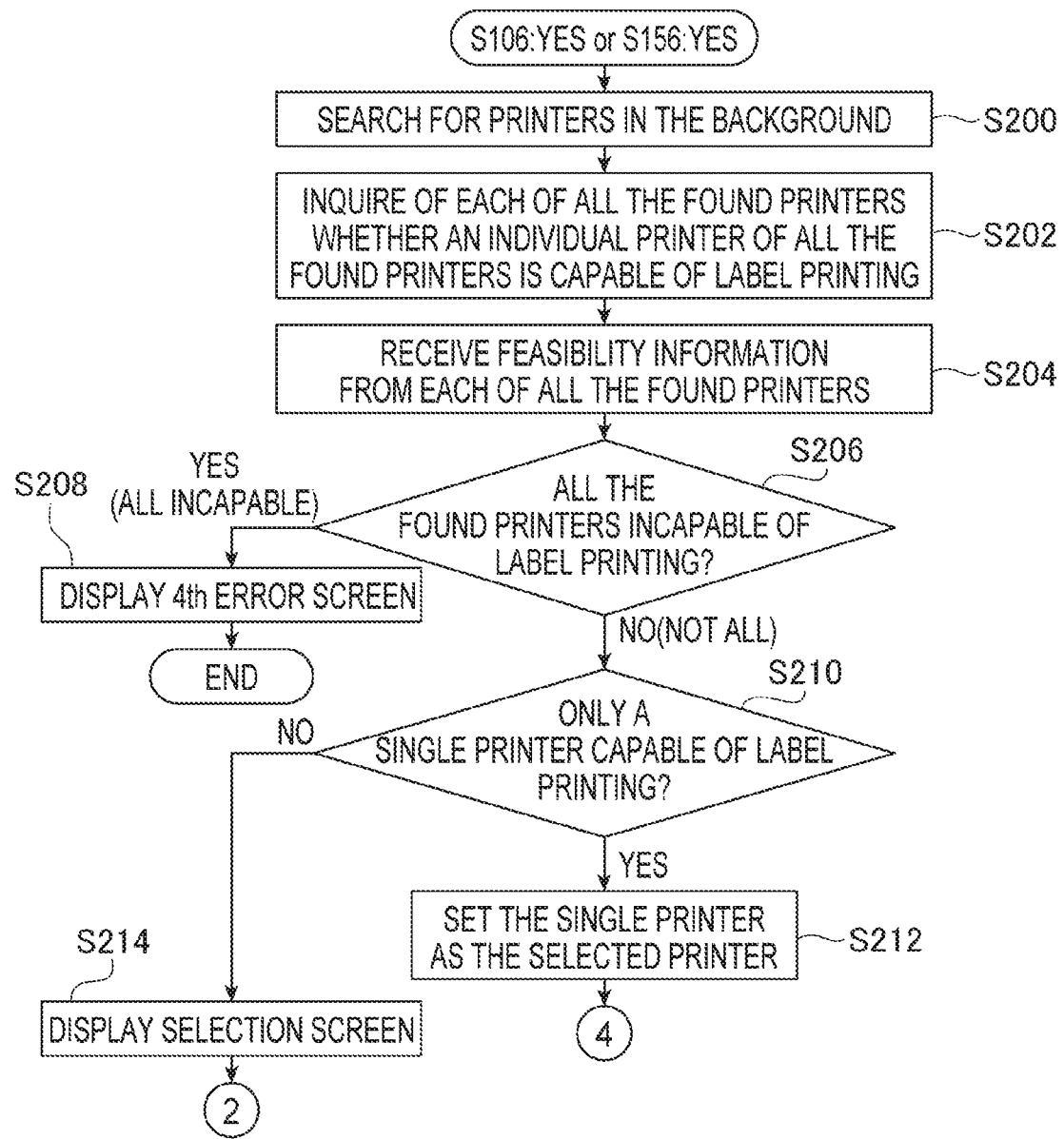

FIG. 15 is a flowchart showing a part of a sequence of processes to be performed by execution of the control application stored in the mobile phone, in the second illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

<Configuration of Communication System>

FIG. 1 is a block diagram schematically showing an electrical configuration of a communication system 1 of a first illustrative embodiment according to aspects of the present disclosure. The communication system 1 includes a mobile phone 10, printers 50, 52, 54, and 56, an access point 60, and a base station 62.

The mobile phone 10 includes a CPU 12, a memory 14, a first wireless communication I/F 16 ("I/F" is an abbreviation of "interface"), a second wireless communication I/F 18, a mobile phone communication I/F 20, an LCD 22, and a touch panel 24. These elements included in the mobile phone 10 are interconnected via a bus 28.

The first wireless communication I/F 16 is configured to perform near-field wireless communication such as Bluetooth® (a trademark registered by Bluetooth SIG) with the printer 50 based on international standards of ISO/IEC 21481 or ISO/IEC 18092. Namely, when brought within a communicable range for Bluetooth wireless communication from the printer 50, the mobile phone 10 may perform data communication with the printer 50.

The second wireless communication I/F 18 is configured to perform wireless communication such as Wi-Fi® (a trademark registered by Wi-Fi Alliance) communication (hereinafter referred to as "WF communication") with the printers 52 and 54 based on IEEE 802.11 standards or standards complying with IEEE 802.11 standards. Namely, when accessing the access point 60 and brought into a communicable state based on a WF-communication protocol, the mobile phone 10 may perform data communication with the printers 52 and 54.

The mobile phone communication I/F 20 is configured to perform wireless communication with the printer 56 based on a mobile-phone communication protocol. Namely, when brought into a communicable state based on the mobile-phone communication protocol, the mobile phone 10 may perform data communication with the printer 56 via the base station 62.

The CPU 12 is configured to perform processing according to a control application 30 or a plug-in 32 that are stored in the memory 14. The control application 30 includes one or more programs for causing a printer (e.g., the printer 50) to perform printing via the mobile phone 10. The plug-in 32 includes one or more programs for adding a new function to the control application 30. Specifically, the plug-in 32 may include a program for generating image data for label printing and causing the printer 52 to perform a label printing process under control according to the control application 30. It is noted that, hereinafter, the CPU 12 executing the control application 30 or another application may be simply referred to as a name of the application. For instance, in the following description, "the control application 30" may denote "the CPU 12 executing the control application 30."

The memory 14 has a data storage area 34. The data storage area 34 is an area to store data necessary for executing the control application 30. The memory 14 may include at least one of a RAM, a ROM, a flash memory, an HDD, and a buffer of the CPU 12.

The LCD 22 has a display surface configured to display various functions of the mobile phone 10. The touch panel 24 includes a touch sensor. The touch panel 24 is disposed to cover the display surface of the LCD 22. The touch panel 24 is configured to detect an indicator (e.g., a finger of a user, a touch pen, and a stylus) brought in proximity to or in contact with the touch panel 24 and to output an electrical signal in response to detecting the indicator.

<Operations in Communication System>

In the mobile phone 10 included in the communication system 1, the plug-in 32 generates image data for label printing, and the control application 30 transmits the image data for label printing to a specific printer communicable with the mobile phone 10. Thereby, the specific printer performs the label printing process. In this regard, however, not all the printers (e.g., the printers 50, 52, 54, and 56) communicable with the mobile phone 10 are configured to perform the label printing process. It is noted that, according to aspects of the present disclosure, "printer" may denote a device/apparatus (e.g., various printing machines and multi-function peripherals) having a printing function.

Specifically, the image data for label printing is communicable only via the WF communication. Hence, neither the printer 50 configured to communicate with the mobile phone 10 via the Bluetooth communication nor the printer 56 configured to communicate with the mobile phone 10 via the mobile-phone communication is capable of performing the label printing process. In addition, the printer 54 is communicable with the mobile phone 10 via the WF communication but is not configured to perform the label printing process. Namely, only the printer 52, among the printers 50, 52, 54, and 56, is capable of performing the label printing process.

Therefore, in an attempt to perform the label printing process by a selected one of the printers 50, 54, and 56, an error screen is displayed on the LCD 22 of the mobile phone 10. In this case, the user needs to reselect a printer for the label printing process. In a known method, for instance, after the error screen is displayed, the user may operate a setting button to display a setting screen on the LCD 22. Then, by operating a button to select one of printers on the setting screen, the user may cause the LCD 22 to display a selection screen. Further, by operating a button to select an intended printer on the selection screen, the user may reselect the intended printer for the label printing process. Thus, the known method is not user-friendly as the user needs to perform a lot of operations to reselect the intended printer.

Further, there may be a case where a printer for the label printing process is not selected when the user attempts to perform the label printing process. In this case as well, the user needs to select a printer for the label printing process in accordance with a procedure as exemplified above. Such a procedure is not user-friendly. In the first illustrative embodiment, in order to address the above problems, when a printer for the label printing process is not selected, or when a printer for the label printing process is selected but incapable of performing the label printing process, the mobile phone 10 may cause the LCD 22 to display a screen for selecting a printer, via a smaller number of user operations than the known procedure.

Specifically, in the mobile phone 10, the plug-in 32 generates the image data for label printing. The image data for label printing may be generated in a known method. After generating the image data for label printing, the plug-in 32 causes the LCD 22 of the mobile phone 10 to display a generated-image display screen 70 as shown in FIG. 2. The generated-image display screen 70 displays thereon an image 72 based on the generated image data for label printing, and a print button 74.

Then, in response to the print button 74 being operated, the plug-in 32 transmits the image data for label printing to the control application 30. At this time, the plug-in 32 transmits, to the control application 30, data identification information and label printing information along with the image data for label printing. The data identification information represents that the transmitted data is the image data for label printing. The label printing information represents whether each of registered printers is capable of performing the label printing process. The label printing information contains at least one of label-printing-capable model information and label-printing capability information. The label-printing-capable model information represents a model name of a printer capable of performing the label printing process. Further, the label-printing capability information is for identifying the label printing process from among printing processes executable by each of the registered printers.

In response to receiving the image data for label printing from the plug-in 32, the control application 30 stores, into the data storage area 34, the image data for label printing and the label printing information that has been received along with the image data for label printing. Further, in response to receiving the image data for label printing from the plug-in 32, the control application 30 determines whether a printer for the label printing process is selected. At this stage where selection of a printer has not yet been described, the control application 30 determines that a printer for the label printing process is not selected. At this time, the control application 30 controls the LCD 22 to display a first error screen 80 as exemplified in FIG. 3. The first error screen 80 is configured to display thereon a notification that a printer for the label printing process is not selected.

Then, in response to the user operating an OK button 82 on the first error screen 80, the control application 30 determines whether an interface to be used for communicating with a printer for the label printing process is the second wireless communication I/F 18. Namely, the control application 30 determines whether a communication protocol of a printer for the label printing process is the WF-communication protocol. It is noted that, at this stage where a printer for the label printing process is not selected, the communication protocol of a printer for the label printing process is set to the WF-communication protocol as a default value. Therefore, the control application 30 determines that the communication protocol of a printer for the label printing process is the WF-communication protocol.

In response to determining that the communication protocol of a printer for the label printing process is the WF-communication protocol, the control application 30 searches for one or more printers communicable with the mobile phone 10 via the WF communication. At this time, the control application 30 controls the LCD 22 to display a search screen 84 as exemplified in FIG. 4. Then, the control application 30 receives model information from each of the printers (i.e., the printers 52 and 54) found as printers communicable with the mobile phone 10 via the WF communication. At this time, each time receiving the model information from an individual one of the found printers 52 and 54, the control application 30 controls the LCD 22 to sequentially display on the search screen 84 a corresponding one of selectable buttons 86 and 88 (see FIG. 5) associated with the respective pieces of received model information.

The selectable button 86 is associated with the model information of the printer 54. On the selectable button 86, the model information of the printer 54 is displayed. The selectable button 88 is associated with the model information of the printer 52. On the selectable button 88, the model information of the printer 52 is displayed. Hereinafter, in order to discriminate the selectable buttons 86 and 88 from each other, the selectable buttons 86 and 88 may be referred to as a "first selectable button 86" and a "second selectable button 88," respectively. It is noted that the search screen 84 on which the selectable buttons 86 and 88 are displayed is configured to, when one of the selectable buttons 86 and 88 is operated, select a printer associated with the operated one of the selectable buttons 86 and 88 as a printer for the label printing process. Therefore, in the following description, the search screen 84 on which the selectable buttons 86 and 88 are displayed may be referred to as a "selection screen 90."

When one of the selectable buttons 86 and 88 is operated on the selection screen 90, a printer associated with the operated one of the selectable buttons 86 and 88 is set as a selected printer. Namely, when the first selectable button 86 is operated, the printer 54 is set as the selected printer. Meanwhile, when the second selectable button 88 is operated, the printer 52 is set as the selected printer. Then, in response to the selected printer being set, the control application 30 inquires of the selected printer whether the selected printer is capable of performing the label printing process.

Specifically, the control application 30 transmits, to the selected printer, an instruction to transmit to the mobile phone 10 feasibility information representing whether the selected printer is capable of performing the label printing process. For the printer 52, information representing that the printer 52 is capable of performing the label printing process is set as the feasibility information. Therefore, in response to receiving from the mobile phone 10 the instruction to transmit the feasibility information, the printer 52 returns, to the mobile phone 10, information representing that the printer 52 is capable of performing the label printing process as the feasibility information. Meanwhile, for the printer 54, information representing that the printer 54 is incapable of performing the label printing process is set as the feasibility information. Therefore, in response to receiving from the mobile phone 10 the instruction to transmit the feasibility information, the printer 54 returns, to the mobile phone 10, information representing that the printer 54 is incapable of performing the label printing process as the feasibility information.

Thereby, when the printer 52 is set as the selected printer, the control application 30 recognizes the selected printer as being capable of performing the label printing process. Meanwhile, when the printer 54 is set as the selected printer, the control application 30 recognizes the selected printer as being incapable of performing the label printing process.

When receiving the information representing that the selected printer (i.e., the printer 52) is capable of performing the label printing process and recognizing the selected printer as being capable of performing the label printing process, the control application 30 controls the LCD 22 to display a first preview screen 100 as exemplified in FIG. 6. The first preview screen 100 is configured to display thereon an image 102, the model information 103 of the selected printer, and a print button 104. The image 102 is based on the image data for label printing that has been received from the plug-in 32. In response to the print button 104 being operated, the control application 30 transmits to the selected printer (i.e., the printer 52) the image data for label printing along with a print instruction. Thereby, the label printing process is performed by the printer 52.

When receiving the information representing that the selected printer (i.e., the printer 54) is incapable of performing the label printing process and recognizing the selected printer as being incapable of performing the label printing process, the control application 30 controls the LCD 22 to display a second error screen 106 as exemplified in FIG. 7. The second error screen 106 is configured to display thereon a notification that the selected printer is incapable of performing the label printing process. Thereby, the user is allowed to recognize that the selected printer (i.e., the printer 54) is incapable of performing the label printing process. In response to an OK button 108 being operated on the second error screen 106, the control application 30 controls the LCD 22 to redisplay the selection screen 90, so as to prompt the user to reselect one of the selectable printers on the selection screen 90 as the selected printer.

In a case where the selected printer is selected while the plug-in 32 is generating the image data for label printing and/or a case where after selection of the selected printer on the selection screen 90, any subsequent process has not been performed, the selected printer is already selected. In such cases, the control application 30 determines whether the selected printer is capable of performing the label printing process, based on the label printing information received from the plug-in 32 along with the image data for label printing.

Specifically, the control application 30 determines whether that label printing information, received from the plug-in 32 along with the image data for label printing, contains the label-printing capability information. When determining that the label printing information contains the label-printing capability information, the control application 30 determines whether printer capability information of the selected printer is stored in the data storage area 34.

The printer capability information is owned by an individual printer, and represents what kind of printing process is executable by the individual printer. For instance, the printer capability information of a printer capable of performing the label printing process contains information representing that the printer is capable of performing the label printing process. Further, the printer capability information of a printer capable of duplex printing contains information representing that the printer is capable of duplex printing. The control application 30 receives respective pieces of printer capability information from printers at various timings. For instance, when searching for printers communicable with the mobile phone 10, the control application 30 receives, from found printers, respective pieces of printer capability information along with respective pieces of model information of the found printers. Then, the control application 30 stores, into the data storage area 34, the received pieces of printer capability information in association with the found printers, respectively. Nonetheless, the control application 30 may not receive the printer capability information from a printer, e.g., due to communication failure.

Hence, the control application 30 determines whether the printer capability information associated with the selected printer is stored in the data storage area 34. When determining that the printer capability information associated with the selected printer is not stored in the data storage area 34, the control application 30 acquires the printer capability information from the selected printer. After acquiring the printer capability information from the selected printer, the control application 30 stores the acquired printer capability information into the data storage area 34 in association with the selected printer. Then, the control application 30 determines whether the acquired printer capability information contains the label-printing capability information received from the plug-in 32. Meanwhile, when determining that the printer capability information associated with the selected printer is stored in the data storage area 34, the control application 30 determines whether the printer capability information stored in the data storage area 34 contains the label-printing capability information received from the plug-in 32.

At this time, in a case where the printer capability information contains the label-printing capability information, it is recognized that the label printing process is included in the printing processes executable by the selected printer. Meanwhile, in a case where the printer capability information does not contain the label-printing capability information, it is recognized that the label printing process is not included in the printing processes executable by the selected printer. Namely, in the case where the printer capability information contains the label-printing capability information, it is recognized that the selected printer is capable of performing the label printing process. Meanwhile, in the case where the printer capability information does not contain the label-printing capability information, it is recognized that the selected printer is incapable of performing the label printing process.

In the case where the printer capability information does not contain the label-printing capability information (i.e., in the case where it is recognized that the selected printer is incapable of performing the label printing process), the control application 30 controls the LCD 22 to display a third error screen 110 as exemplified in FIG. 8. The third error screen 110 is configured to display thereon a notification that the selected printer is incapable of performing the label printing process, substantially in the same manner as the second error screen 106. Processes to be executed after the third error screen 110 is displayed will be described in detail later.

In the case where the printer capability information contains the label-printing capability information (i.e., in the case where it is recognized that the selected printer is capable of performing the label printing process), the control application 30 determines whether the label printing information, received from the plug-in 32 along with the image data, contains the label-printing-capable model information. When determining that the label printing information contains the label-printing-capable model information, the control application 30 determines whether the selected printer is capable of performing the label printing process, based on the label-printing-capable model information. Thus, after it is determined that the selected printer is capable of performing the label printing process, based on the label-printing capability information, it is further determined whether the selected printer is capable of performing the label printing process, based on the label-printing-capable model information. Thereby, it is more exactly determined whether the selected printer is capable of performing the label printing process.

Then, when determining whether the selected printer is capable of performing the label printing process, based on the label-printing-capable model information, the control application 30 determines whether the label-printing-capable model information contains model information (hereinafter referred to as "selected-model information") of the selected printer. As described above, the label-printing-capable model information represents a model name of a printer capable of performing the label printing process. Therefore, when the label-printing-capable model information contains the selected-model information, the selected printer is recognized as being capable of performing the label printing process. Meanwhile, when the label-printing-capable model information does not contain the selected-model information, the selected printer is recognized as being incapable of performing the label printing process.

When the label-printing-capable model information contains the selected-model information (i.e., when the selected printer is recognized as being capable of performing the label printing process), the control application 30 controls the LCD 22 to display the first preview screen 100 (see FIG. 6). Thereby, the user may cause the selected printer to perform the label printing process. Meanwhile, when the label-printing-capable model information does not contain the selected-model information (i.e., when the selected printer is recognized as being incapable of performing the label printing process), the control application 30 controls the LCD 22 to display the third error screen 110 (see FIG. 8). Thereby, the user recognizes that it is not possible to perform the label printing process by the selected printer.

Namely, in the case where the label printing information, received from the plug-in 32 along with the image data, contains the label-printing capability information and the label-printing-capable model information, only when it is determined based on the label-printing capability information that the selected device is capable of performing the label printing process, and it is determined based on the label-printing-capable model information that the selected device is capable of performing the label printing process, the user is allowed to perform the label printing process by the selected printer. Thus, various conditions are set as requirements for performing the label printing process by the selected printer. Thereby, only the selected printer that meets the various conditions is identified as being capable of performing the label printing process.

When the label printing information, received from the plug-in 32 along with the image data, does not contain the label-printing-capable model information, the control application 30 is unable to determine whether the selected printer is capable of performing the label printing process, based on the label-printing-capable model information. In this case, the control application 30 controls the LCD 22 to display the first preview screen 100 (see FIG. 6).

The above description has presented an explanation of the case where the label printing information, received from the plug-in 32 along with the image data, contains the label-printing capability information. Nonetheless, when the label printing information does not contain the label-printing capability information (i.e., when the label printing information contains only the label-printing-capable model information), the control application 30 determines whether the selected printer is capable of performing the label printing process, based on the label-printing-capable model information, without determining whether the selected printer is capable of performing the label printing process, based on the label-printing capability information.

The method for determining whether the selected printer is capable of performing the label printing process, based on the label-printing-capable model information, has been already described above. Therefore, a repetitive explanation of the method will be omitted. When determining that the selected printer is capable of performing the label printing process, based on the label-printing-capable model information, the control application 30 controls the LCD 22 to display the first preview screen 100 (see FIG. 6). Meanwhile, when determining that the selected printer is incapable of performing the label printing process, based on the label-printing-capable model information, the control application 30 controls the LCD 22 to display the third error screen 110 (see FIG. 8).

Subsequently, processes to be executed after the third error screen 110 is displayed on the LCD 22 will be described. Namely, processes to be executed after it is determined based on the label-printing capability information that the selected printer is incapable of performing the label printing process and then the third error screen 110 is displayed on the LCD 22, and processes to be executed after it is determined based on the label-printing-capable model information that the selected printer is incapable of performing the label printing process and then the third error screen 110 is displayed on the LCD 22 will be described. As described above, on the third error screen 110, the notification that the selected printer is incapable of performing the label printing process is displayed. When the user recognizes the notification and operates an OK button 112 on the third error screen 110, the control application 30 determines whether the second wireless I/F 18 is usable for communication with the selected printer. Namely, the control application 30 determines whether the communication protocol for the selected printer is the WF-communication protocol.

When determining that the communication protocol for the selected printer is not the WF-communication protocol (i.e., when the printer 50 is set as the selected printer, and the communication protocol for the printer 50 is the Bluetooth communication protocol, or when the printer 56 is set as the selected printer, and the communication protocol for the printer 56 is the mobile-phone communication protocol), the control application 30 controls the LCD 22 to display an I/F switching screen 120 as exemplified in FIG. 9. The I/F switching screen 120 is configured to display thereon a notification that the communication protocol for the selected printer is not the WF-communication protocol and that the label printing process is not allowed to be performed using any communication protocol but the WF-communication protocol. This is because, as described above, neither the printer 50 configured to communicate with the mobile phone 10 via the Bluetooth communication nor the printer 56 configured to communicate with the mobile phone 10 via the mobile-phone communication is capable of performing the label printing process.

Further, the I/F switching screen 120 is configured to display thereon a message for inquiring of the user whether the user wishes to switch a currently-applied communication protocol for the mobile phone 10 to the WF-communication protocol. When a NO button 124 is operated on the I/F switching screen 120 (i.e., when the user does not wish to switch the currently-applied communication protocol to the WF-communication protocol), the control application 30 controls the LCD 22 to display a second preview screen 140 as exemplified in FIG. 10. The second preview screen 140 is configured to display an image 142 based on the image data for label printing in the same manner as the first preview screen 100 (see FIG. 6), except the print button 104 is not displayed on the second preview screen 140. This is because the selected printer is incapable of performing the label printing process.

Further, when an YES button 122 is operated on the I/F switching screen 120 (i.e., when the user wishes to switch the currently-applied communication protocol to the WF-communication protocol), the control application 30 switches the currently-applied communication protocol for the mobile phone 10 to the WF-communication protocol. Subsequently, the control application 30 controls the LCD 22 to display the search screen 84 (see FIG. 4) and searches for printers wirelessly communicable with the mobile phone 10 via the WF communication. Then, the control application 30 displays, on the search screen 84, selectable buttons (e.g., the selectable buttons 86 and 88) associated with respective pieces of model information of found printers, thereby displaying the selection screen 90 (see FIG. 5) on the LCD 22. The processes to be executed after the selection screen 90 is displayed on the LCD 22 have been already described above. Therefore, a repetitive explanation of the processes will be omitted.

Thus, when the selected printer is not specified, the mobile phone 10 displays the first error screen 80 (see FIG. 3) on the LCD 22. Then, in response to the OK button 82 being operated on the first error screen 80, the mobile phone 10 searches for printers communicable with the mobile phone 10 and displays found printers on the selection screen 90. Thus, in the first illustrative embodiment, the aforementioned method/procedure makes it possible for the user to select one of the found printers as the selected printer via a smaller number of user operations than the known technique, thereby improving the operability of the mobile phone 10.

Further, when the selected printer is specified, but the selected printer is incapable of performing the label printing process, the mobile phone 10 displays the third error screen 110 (see FIG. 8) on the LCD 22. Then, in response to the OK button 112 being operated on the third error screen 110, the mobile phone 10 searches for printers communicable with the mobile phone 10 and displays found printers on the selection screen 90. Thus, in the first illustrative embodiment, the aforementioned method/procedure makes it possible for the user to reselect one of the found printers as the selected printer via a smaller number of user operations than the known technique, thereby improving the operability of the mobile phone 10.

<Processes by Control Application>

When executed by the CPU 12, the control application 30 causes the CPU 12 to perform the label printing process. Hereinafter, referring to FIGS. 11 to 13, a sequence of processes to be performed by the CPU 12 executing the control application 30 will be described.

First, the CPU 12 determines whether image data for label printing has been received from the plug-in 32 (S100). When determining that image data for label printing has not been received from the plug-in 32 (S100: No), the CPU 12 repeatedly executes S100. Meanwhile, when determining that image data for label printing has been received from the plug-in 32 (S100: Yes), the CPU 12 determines whether a printer is specified as a selected printer for the label printing process (S102).

When determining that a printer is not specified as the selected printer for the label printing process (S102: No), the CPU 12 controls the LCD 22 to display the first error screen 80 (S104). Then, the CPU 12 determines whether the OK button 82 has been operated on the first error screen 80 (S106). When determining that the OK button 82 has not been operated (S106: No), the CPU 12 repeatedly executes S106. Meanwhile, when determining that the OK button 82 has been operated (S106: No), the CPU 12 determines whether a currently-applied communication interface for the selected printer is the second wireless I/F 18 (S108).

When determining that the currently-applied communication interface for the selected printer is not the second wireless I/F 18 (S108: No), the CPU 12 controls the LCD 22 to display the I/F switching screen 120 (S110). Subsequently, the CPU 12 determines whether the YES button 122 has been operated on the I/F switching screen 120 (S112). When determining that the YES button 122 has not been operated (S112: No) (i.e., when the NO button 124 has been operated), the CPU 12 controls the LCD 22 to display the second preview screen 140 on which a print button is not displayed (S114). Afterwards, the CPU 12 terminates the sequence shown in FIGS. 11 to 13.

When determining that the YES button 122 has been operated (S112: Yes), the CPU 12 switches the currently-applied communication protocol for the mobile phone 10 to the WF-communication protocol (S116). Next, the CPU 12 controls the LCD 22 to display the search screen 84, and searches for printers wirelessly communicable with the mobile phone 10 via the WF communication (S118). Then, each time finding an individual printer, the CPU 12 displays on the search screen 84 a selectable button associated with the found printer (S120).

Subsequently, the CPU 12 determines whether one of the found printers is selected on the selection screen 90 (i.e., the search screen 84 with the found printers displayed thereon) (S122). When determining that one of the found printers is not selected (S122: No), the CPU 12 repeatedly executes S122. Meanwhile, when determining that one of the found printers is selected (S122: Yes), the CPU 12 inquiries of the selected printer whether the selected printer is capable of performing the label printing process (S124). In other words, in S124, the CPU 12 transmits, to the selected printer, an instruction to transmit to the mobile phone 10 feasibility information representing whether the selected printer is capable of performing the label printing process.

Subsequently, the CPU 12 receives, from the selected printer, the feasibility information as a reply to the inquiry (S126). Then, based on the received feasibility information, the CPU 12 determines whether the selected printer is capable of performing the label printing process (S128). When determining that the selected printer is capable of performing the label printing process (S128: Yes), the CPU 12 controls the LCD 22 to display the first preview screen 100 (S130).

Subsequently, the CPU 12 determines whether the print button 104 has been operated on the first preview screen 100 (S132). When determining that the print button 104 has not been operated on the first preview screen 100 (S132: No), the CPU 12 repeatedly executes S132. Meanwhile, when determining that the print button 104 has been operated on the first preview screen 100 (S132: Yes), the CPU 12 transmits, to the selected printer, the image data for label printing received from the plug-in 32 in S100 (S134). Afterwards, the CPU 12 terminates the sequence shown in FIGS. 11 to 13.

When determining that the selected printer is incapable of performing the label printing process (S128: No), the CPU 12 controls the LCD 22 to display the second error screen 106 (S136). Then, the CPU 12 determines whether the OK button 108 has been operated on the second error screen 106 (S138). When determining that the OK button 108 has not been operated (S138: No), the CPU 12 repeatedly executes S138. Meanwhile, when determining that the OK button 108 has been operated (S138: Yes), the CPU 12 executes S122 and the subsequent steps.

When determining that a printer is specified as the selected printer for the label printing process (S102: Yes), the CPU 12 determines whether label printing information, received in S100 along with the image data, contains label-printing capability information (S140). When determining that the label printing information contains label-printing capability information (S140: Yes), the CPU 12 determines whether printer capability information of the selected printer is stored in the data storage area 34 (S142).

When determining that printer capability information of the selected printer is not stored in the data storage area 34 (S142: No), the CPU 12 receives printer capability information from the selected printer (S144). Next, the CPU 12 stores the received printer capability information into the data storage area 34 (S146). Then, the CPU 12 goes to S148. Further, when determining that printer capability information of the selected printer is stored in the data storage area 34 (S142: Yes), the CPU 12 goes to S148.

In S148, the CPU 12 determines whether the printer capability information of the selected printer contains label-printing capability information (S148). When determining that the printer capability information of the selected printer contains label-printing capability information (S148: Yes), the CPU 12 determines whether the label printing information, received in S100 along with the image data, contains label-printing-capable model information (S150).

When determining that the label printing information contains label-printing-capable model information (S150: Yes), the CPU 12 determines whether the label-printing-capable model information contains selected-model information (S152). When determining that the label-printing-capable model information does not contain selected-model information (S152: No), the CPU 12 controls the LCD 22 to display the third error screen 110 (S154). Then, the CPU 12 determines whether the OK button 112 has been operated on the third error screen 110 (S156). When determining that the OK button 112 has not been operated on the third error screen 110 (S156: No), the CPU 12 repeatedly executes S156. Meanwhile, when determining that the OK button 112 has been operated on the third error screen 110 (S156: Yes), the CPU 12 executes S108 and the subsequent steps.

Further, when determining that the label printing information does not contain label-printing-capable model information (S150: No), or when determining that the label-printing-capable model information contains selected-model information (S152: Yes), the CPU 12 executes S130 and the subsequent steps.

Further, when determining that the printer capability information of the selected printer does not contain label-printing capability information (S148: No), the CPU 12 executes S154 and the subsequent steps. Further, when determining that the label printing information does not contain label-printing capability information (S140: No), the CPU 12 executes S152 and the subsequent steps.

Second Illustrative Embodiment

In the mobile phone 10 of the aforementioned first illustrative embodiment, when a printer is not specified as the selected printer, the first error screen 80 (see FIG. 3) is displayed on the LCD 22, and a printer is specified as the selected printer. When the selected printer is incapable of performing the label printing process, the third error screen 110 (see FIG. 8) is displayed on the LCD 22. At this time, in response to the OK button 82 on the first error screen 80 or the OK button 112 on the third error screen 110 being operated, the control application 30 (more specifically, the CPU 12 executing the control application 30) searches for printers communicable with the mobile phone 10, and displays on the LCD 22 the selection screen 90 on which found printers are displayed. Then, when an intended one of the found printers is selected on the selection screen 90, the intended printer is set as the selected printer.

Meanwhile, in the mobile phone 10 of a second illustrative embodiment, in response to the OK button 82 on the first error screen 80 or the OK button 112 on the third error screen 110 being operated, the control application 30 (more specifically, the CPU 12 executing the control application 30) may search for printers communicable with the mobile phone 10, and may determine whether each individual found printer is capable of performing the label printing process. At this time, when determining that only a single printer, among the found printers, is capable of performing the label printing process, the control application 30 may automatically set the single printer as the selected printer.

Specifically, in response to the OK button 82 on the first error screen 80 or the OK button 112 on the third error screen 110 being operated, the control application 30 searches for printers communicable with the mobile phone 10. At this time, the search screen 84 is not displayed on the LCD 22. Instead, the first error screen 80 or the third error screen 110 continues to be displayed on the LCD 22. Namely, the control application 30 searches for printers communicable with the mobile phone 10 in the background.

Subsequently, after finding printers communicable with the mobile phone 10, the control application 30 inquires of each of all the found printers whether an individual printer of all the found printers is capable of performing the label printing process. Namely, the control application 30 transmits, to each of all the found printers, an instruction to transmit the feasibility information to the mobile phone 10. Thereby, a printer capable of performing the label printing process transmits, to the mobile phone 10, the feasibility information representing that the printer is capable of performing the label printing process. Further, a printer incapable of performing the label printing process transmits, to the mobile phone 10, the feasibility information representing that the printer is incapable of performing the label printing process.

At this time, when receiving, from each of all the found printers, the feasibility information representing that an individual printer of all the found printers is incapable of performing the label printing process, the control application 30 controls the LCD 22 to display a fourth error screen 150 as exemplified in FIG. 14. Namely, when none of the printers communicable with the mobile phone 10 is capable of performing the label printing process, the fourth error screen 150 is displayed on the LCD 22. The fourth error screen 150 is configured to display thereon a notification that there is no printer found that is capable of performing the label printing process. Thereby, the user recognizes that it is impossible to perform the label printing process.

When receiving, from each of two or more printers of all the found printers, the feasibility information representing that an individual printer of the two or more printers is capable of performing the label printing process, the control application 30 controls the LCD 22 to display the selection screen 90 (see FIG. 5). Namely, when two or more printers, among all the printers communicable with the mobile phone 10, are capable of performing the label printing process, the selection screen 90 is displayed on the LCD 22. The selection screen 90 is configured to display thereon selectable buttons (e.g., the selectable buttons 86 and 88). Each of the selectable buttons is configured to, when operated, specify, as the selected printer, a corresponding printer from among the two or more printers each of which has transmitted the feasibility information representing that an individual printer of the two or more printers is capable of performing the label printing process (i.e., from among the two or more printers that are communicable with the mobile phone 10 and capable of performing the label printing process). Thereby, the user is allowed to specify the selected printer capable of performing the label printing process on the selection screen 90. Then, in response to the selected printer being specified on the selection screen 90, the control application 30 controls the LCD 22 to display the first preview screen 100 (see FIG. 6). At this time, in response to the print button 104 being operated on the first preview screen 100, the control application 30 transmits the image data received from the plug-in 32 to the selected printer.

In the mobile phone 10 of the second illustrative embodiment, when the selected printer is not specified, the first error screen 80 is displayed on the LCD 22. Further, when the selected printer is specified but incapable of performing the label printing process, the third error screen 110 is displayed on the LCD 22. In response to the OK button 82 on the first error screen 80 or the OK button 112 on the third error screen 110 being operated, the mobile phone 10 searches for and finds printers communicable with the mobile phone 10, and displays, on the selection screen 90, printers capable of performing the label printing process among the found printers. Thus, in the second illustrative embodiment, the aforementioned method/procedure makes it possible for the user to specify the selected printer from among the found printers via a smaller number of user operations than the known technique, thereby improving the operability of the mobile phone 10.

In the second illustrative embodiment, the feasibility information is used to determine whether each individual printer communicable with the mobile phone 10 is capable of performing the label printing process. Nonetheless, the label printing information exemplified in the aforementioned first illustrative embodiment may be used to determine whether each individual printer communicable with the mobile phone 10 is capable of performing the label printing process. Namely, a sequence of S140 to S152 exemplified in FIG. 13 may be executed to determine whether each individual printer communicable with the mobile phone 10 is capable of performing the label printing process. In this regard, however, when the sequence of S140 to S152 is executed for every printer communicable with the mobile phone 10, it might result in a more complicated procedure and a longer period of time required for determining whether each individual printer communicable with the mobile phone 10 is capable of performing the label printing process. Therefore, it is preferred to use the feasibility information for determining whether each individual printer communicable with the mobile phone 10 is capable of performing the label printing process.

Further, when receiving, from a single printer of all the found printers communicable with the mobile phone 10, the feasibility information representing that the single printer is capable of performing the label printing process, the control application 30 sets the single printer as the selected printer. Namely, when only a single printer, among all the printers communicable with the mobile phone 10, is capable of performing the label printing process, the single printer is set as the selected printer. Then, the control application 30 controls the LCD 22 to display the first preview screen 100 (see FIG. 6). On the first preview screen 100, the model information 103 of the selected printer is displayed. Therefore, the user is allowed to recognize which printer is set to perform the label printing process, based on the model information 103. Then, in response to the print button 104 being operated on the preview screen 103, the control application 30 transmits the image data received from the plug-in 32 to the selected printer.

Thus, in the mobile phone 10 of the second illustrative embodiment, when only a single printer, among the printers communicable with the mobile phone 10, is capable of performing the label printing process, the single printer is automatically set as the selected printer with no need for the user to select the single printer, and the first preview screen 100 is displayed on the LCD 22. Thereby, in the second illustrative embodiment, the aforementioned method/procedure makes it possible for the user to cause the selected printer to perform the label printing process via a smaller number of user operations than the known technique, thereby improving the operability of the mobile phone 10.

In the second illustrative embodiment, the label printing process is performed by the CPU 12 executing the control application 30. Hereinafter, referring to FIG. 15, a sequence of processes to be performed by the CPU 12 executing the control application 30 of the second illustrative embodiment will be described. Nonetheless, since the sequence includes a lot of processes in common with the aforementioned first illustrative embodiment, explanations of the common processes may be omitted.

In the second illustrative embodiment, in response to the OK button 82 on the first error screen 80 being operated in S106 exemplified in the first illustrative embodiment (see FIG. 11, S106: Yes) or the OK button 112 on the third error screen 110 being operated in S156 exemplified in the first illustrative embodiment (see FIG. 13, S156: Yes), the CPU 12 searches for printers communicable with the mobile phone 10 in the background (S200). Next, the CPU 12 inquires of each of all the found printers whether an individual printer of all the found printers is capable of performing the label printing process (S202). Namely, the CPU 12 transmits, to each of all the found printers, an instruction to transmit the feasibility information.

Subsequently, the CPU 12 receives the feasibility information from each of all the found printers as a reply to the inquiry (S204). Then, based on the received feasibility information, the CPU 12 determines whether all the found printers, each of which has transmitted the feasibility information, are incapable of performing the label printing process (S206). At this time, when determining that all the found printers are incapable of performing the label printing process (S206: Yes), the CPU 12 controls the LCD 22 to display the fourth error screen 150 (S208). Afterwards, the CPU 12 terminates the present sequence.

Meanwhile, when determining that not all the found printers are incapable of performing the label printing process (S206: No), the CPU 12 determines whether only a single printer, among the found printers, is capable of performing the label printing process (S210). When determining that only a single printer is capable of performing the label printing process (S210: Yes), the CPU 12 sets the single printer as the selected printer (S212). Then, the CPU 12 executes S130 and the subsequent steps exemplified in the aforementioned first illustrative embodiment.

Meanwhile, when determining that two or more printers are capable of performing the label printing process (S210: No), the CPU 12 controls the LCD 22 to display selectable buttons on the selection screen 90 in association with the two or more printers, respectively (S214). Afterwards, the CPU 12 executes S122 and the subsequent steps.

Hereinabove, the illustrative embodiments according to aspects of the present disclosure have been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only exemplary illustrative embodiments of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

<Modifications>

In the aforementioned first and second illustrative embodiments, in response to the OK button 82 on the first error screen 80 being operated or the OK button 112 on the third error screen 110 being operated, the control application 30 searches for printers communicable with the mobile phone 10. Nonetheless, in response to one of the other operable buttons of the mobile phone 10 being operated while the first error screen 80 is being displayed, the control application 30 may search for printers communicable with the mobile phone 10. Further, in response to one of the other operable buttons of the mobile phone 10 being operated after a lapse of a particular period of time from when the first error screen 80 has begun to be displayed, the control application 30 may search for printers communicable with the mobile phone 10.

In the aforementioned first illustrative embodiment, when the selected printer is specified on the selection screen 90, the control application 30 determines whether the selected printer is capable of performing the label printing process, based on the feasibility information. Further, in a case where the selected printer is already specified at a time when the image data has been received from the plug-in 32, the control application 30 determines whether the selected printer is capable of performing the label printing process, based on the label printing information. Nonetheless, when the selected printer is specified on the selection screen 90, it may be determined whether the selected printer is capable of performing the label printing process, based on the label printing information. Further, in the case where the selected printer is already specified at the time when the image data has been received from the plug-in 32, it may be determined whether the selected printer is capable of performing the label printing process, based on the feasibility information. Namely, the steps S124 to S128 in FIG. 12 and the steps S140 to S152 in FIG. 13 may be replaced with each other.

In the aforementioned first illustrative embodiment, in a case where the label printing information contains the label-printing capability information and the label-printing-capable model information, only when it is determined that the selected printer is capable of performing the label printing process, based on both the label-printing capability information and the label-printing-capable model information, the user is allowed to cause the selected printer to perform the label printing process. Nonetheless, for instance, when it is determined that the selected printer is capable of performing the label printing process, based on one of the label-printing capability information and the label-printing-capable model information, the user may cause the selected printer to perform the label printing process. In this case, in a case where it is determined whether the selected printer is capable of performing the label printing process, based on only the label-printing capability information, when the printer capability information of the selected printer contains the label-printing capability information (S148: Yes), the CPU 12 may proceed to S130. Further, in a case where it is determined whether the selected printer is capable of performing the label printing process, based on only the label-printing-capable model information, the CPU 12 may not execute any of S142 to S150.

In the aforementioned first and second illustrative embodiments, aspects of the present disclosure are applied to when a particular process is performed based on the image data generated by the plug-in 32. Nonetheless, aspects of the present disclosure may be applied to when a particular process is performed based on image data generated by the control application 30 or another program.

In the aforementioned first and second illustrative embodiments, aspects of the present disclosure are applied to the label printing process as a particular kind of image processing. Nonetheless, aspects of the present disclosure may be applied to various kinds of image processing.

In the aforementioned first and second illustrative embodiments, the CPU 12 performs the processes shown in FIGS. 11 to 13 and 15. Nonetheless, instead of the CPU 12, one or more ASICs or one or more logic integrated circuits may perform the processes shown in FIGS. 11 to 13 and 15. Further, one or more CPUs, one or more ASICs, and one or more logic integrated circuits may perform the processes shown in FIGS. 11 to 13 and 15, in cooperation with each other.

Associations between elements exemplified in the aforementioned illustrative embodiment and elements according to aspects of the present disclosure will be exemplified below. The mobile phone 10 may be an example of an "information processing device" according to aspects of the present disclosure. The printers 50, 52, 54, and 56 may examples of "image processing apparatuses" according to aspects of the present disclosure. The CPU 12 of the mobile phone 10 may be an example of a "processor" according to aspects of the present disclosure. The memory 14 of the mobile phone 10 may be an example of a "non-transitory computer-readable medium" according to aspects of the present disclosure. The second wireless communication I/F 18 of the mobile phone 10 may be an example of a "communication interface" according to aspects of the present disclosure. The LCD 22 of the mobile phone 10 may be an example of a "display" according to aspects of the present disclosure. The touch panel 24 of the mobile phone 10 may be an example of an "operation interface" according to aspects of the present disclosure. The control application 30 may be an example of "computer-readable instructions" according to aspects of the present disclosure. The plug-in 32 may be an example of "computer-readable image data generating instructions" according to aspects of the present disclosure. The data storage area 34 of the memory 14 may be an example of a "memory" according to aspects of the present disclosure. The label printing process may be an example of a "particular kind of image processing" according to aspects of the present disclosure. The label-printing-capable model information may be an example of "identification information" according to aspects of the present disclosure. The label-printing capability information may be an example of "first capability information" according to aspects of the present disclosure. The printer capability information may be an example of "second capability information" according to aspects of the present disclosure. The first error screen 80 may be an example of a "notification that there is no image processing apparatus set as the selected image processing apparatus" according to aspects of the present disclosure. The search screen 84 may be an example of a "search screen" according to aspects of the present disclosure. The selection screen 90 may be an example of a "selection screen" according to aspects of the present disclosure. The third error screen 110 may be an example of a "notification that the selected image processing apparatus is set but incapable of performing the particular kind of image processing" according to aspects of the present disclosure. The fourth error screen 150 may be an example of a "notification that there is no image processing apparatus capable of performing the particular kind of image processing" according to aspects of the present disclosure.

What is claimed is:

1. A non-transitory computer-readable medium storing computer-readable program instructions that are executable by a processor coupled with an information processing device, the information processing device comprising a communication interface configured to communicate with one or more external apparatuses, the instructions being configured to, when executed by the processor, cause the processor to:
   determine, in response to receiving image data from another set of program instructions, whether a selected image processing apparatus is set;
   in a case where it is determined that the selected image processing apparatus is not set, search for and find one or more image processing apparatuses communicable with the information processing device via the communication interface;
   set a specified one of the found one or more image processing apparatuses as the selected image processing apparatus; and
   cause the selected image processing apparatus to perform a particular kind of image processing.

2. The non-transitory computer-readable medium according to claim 1,
   wherein the information processing device further comprises a display, and
   wherein the instructions are further configured to, when executed by the processor, cause the processor to:
      in the case where it is determined that the selected image processing apparatus is not set, control the display to display a notification that there is no image processing apparatus set as the selected image processing apparatus.

3. The non-transitory computer-readable medium according to claim 2,
   wherein the information processing device further comprises an operation interface, and
   wherein the instructions are further configured to, when executed by the processor, cause the processor to:
      in a case where a particular operation has been accepted via the operation interface while the notification is being displayed on the display, search for and find the one or more image processing apparatuses communicable with the information processing device via the communication interface.

4. The non-transitory computer-readable medium according to claim 1,
   wherein the instructions are further configured to, when executed by the processor, cause the processor to:
      in a case where it is determined that the selected image processing apparatus is set but incapable of performing the particular kind of image processing, search for and find the one or more image processing apparatuses communicable with the information processing device via the communication interface.

5. The non-transitory computer-readable medium according to claim 4,
   wherein the information processing device further comprises a display, and
   wherein the instructions are further configured to, when executed by the processor, cause the processor to:
      in the case where it is determined that the selected image processing apparatus is set but incapable of performing the particular kind of image processing, control the display to display a notification that the selected image processing apparatus is set but incapable of performing the particular kind of image processing.

6. The non-transitory computer-readable medium according to claim 5,
   wherein the information processing device further comprises an operation interface, and
   wherein the instructions are further configured to, when executed by the processor, cause the processor to:
      in a case where a particular operation has been accepted via the operation interface while the notification is being displayed on the display, search for and find the one or more image processing apparatuses communicable with the information processing device via the communication interface.

7. The non-transitory computer-readable medium according to claim 1,
   wherein the information processing device further comprises a display, and
   wherein the instructions are further configured to, when executed by the processor, cause the processor to:
      control the display to display a selection screen for setting a specified one of the found one or more image processing apparatuses as the selected image processing apparatus; and
      in a case where a specified one of the found one or more image processing apparatuses has been set as the selected image processing apparatus via the selection screen, determine whether the selected image processing apparatus is capable of performing the particular kind of image processing.

8. The non-transitory computer-readable medium according to claim 7,
   wherein the information processing device further comprises a memory storing at least one of:

identification information representing whether the selected image processing apparatus is capable of performing the particular kind of image processing; and first capability information representing whether the selected image processing apparatus is capable of performing the particular kind of image processing, and wherein the instructions are further configured to, when executed by the processor, cause the processor to:
determine whether the selected image processing apparatus is capable of performing the particular kind of image processing, based on the at least one of the identification information and the first capability information stored in the memory.

9. The non-transitory computer-readable medium according to claim 8,
wherein the instructions are further configured to, when executed by the processor, cause the processor to:
in a case where the memory stores both the identification information and the first capability information, in response to determining based on the identification information that the selected image processing apparatus is capable of performing the particular kind of image processing and determining based on the first capability information that the selected image processing apparatus is capable of performing the particular kind of image processing, determine that the selected image processing apparatus is capable of performing the particular kind of image processing.

10. The non-transitory computer-readable medium according to claim 9,
wherein the instructions are further configured to, when executed by the processor, cause the processor to:
determine whether the memory stores second capability information, the second capability information representing what kind of image processing is executable by the selected image processing apparatus;
in a case where it is determined that the memory does not store the second capability information, perform:
receiving the second capability information from the selected image processing apparatus;
storing the received second capability information into the memory; and
determining whether the selected image processing apparatus is capable of performing the particular kind of image processing, based on the first capability information and the received second capability information stored in the memory; and
in a case where it is determined that the memory stores the second capability information, determine whether the selected image processing apparatus is capable of performing the particular kind of image processing, based on the first capability information and the second capability information stored in the memory.

11. The non-transitory computer-readable medium according to claim 1,
wherein the information processing device further comprises a display, and
wherein the instructions are further configured to, when executed by the processor, cause the processor to:
while searching for the one or more image processing apparatuses communicable with the information processing device, control the display to display a search screen representing that the information processing device is searching for the one or more image processing apparatuses communicable with the information processing device.

12. The non-transitory computer-readable medium according to claim 1,
wherein the instructions are further configured to, when executed by the processor, cause the processor to:
determine whether each of the found one or more image processing apparatuses is capable of performing the particular kind of image processing; and
in a case where it is determined that a single image processing apparatus, among the found one or more image processing apparatuses, is capable of performing the particular kind of image processing, set the single image processing apparatus as the selected image processing apparatus.

13. The non-transitory computer-readable medium according to claim 12,
wherein the information processing device further comprises a display, and
wherein the instructions are further configured to, when executed by the processor, cause the processor to:
in a case where it is determined that two or more image processing apparatuses are capable of performing the particular kind of image processing, control the display to display a selection screen for setting a specified one of the two or more image processing apparatuses as the selected image processing apparatus.

14. The non-transitory computer-readable medium according to claim 12,
wherein the information processing device further comprises a display, and
wherein the instructions are further configured to, when executed by the processor, cause the processor to:
in a case where it is determined that all the found one or more image processing apparatuses are incapable of performing the particular kind of image processing, control the display to display a notification that there is no image processing apparatus capable of performing the particular kind of image processing.

15. The non-transitory computer-readable medium according to claim 1,
wherein the communication interface is configured to communicate with the one or more external apparatuses based on a predetermined communication protocol, and
wherein the instructions are further configured to, when executed by the processor, cause the processor to:
search for and find the one or more image processing apparatuses communicable with the information processing device based on the predetermined communication protocol via the communication interface.

16. The non-transitory computer-readable medium according to claim 1, further storing computer-readable image data generating instructions configured to, when executed by the processor, cause the processor to generate image data for the particular kind of image processing.

17. The non-transitory computer-readable medium according to claim 16,
wherein the instructions are further configured to, when executed by the processor, cause the processor to:
receive the image data generated by execution of the image data generating instructions; and
in a case where the image data has been received, search for and find the one or more image processing apparatuses communicable with the information processing device via the communication interface.

18. An information processing device comprising:
a communication interface configured to communicate with one or more external apparatuses; and
a controller configured to:
  determine, in response to receiving image data from a set of program instructions, whether a selected image processing apparatus is set;
  in a case where it is determined that the selected image processing apparatus is not set, search for and find one or more image processing apparatuses communicable with the information processing device via the communication interface;
  set a specified one of the found one or more image processing apparatuses as the selected image processing apparatus; and
  cause the selected image processing apparatus to perform a particular kind of image processing.

19. A method implementable by a processor coupled with an information processing device, the information processing device comprising a communication interface configured to communicate with one or more external apparatuses, the method comprising:
  determining, in response to receiving image data from a set of program instructions, whether a selected image processing apparatus is set;
  in a case where it is determined that the selected image processing apparatus is not set, searching for and finding one or more image processing apparatuses communicable with the information processing device via the communication interface;
  setting a specified one of the found one or more image processing apparatuses as the selected image processing apparatus; and
  causing the selected image processing apparatus to perform a particular kind of image processing.

20. The non-transitory computer-readable medium according to claim 1,
  wherein the instructions are further configured to, when executed by the processor, cause the processor to:
  in the case where it is determined that the selected image processing apparatus is set, cause the selected image processing apparatus to perform the particular kind of image processing, without searching for an image processing apparatus.

* * * * *